United States Patent
Fairlie et al.

(10) Patent No.: US 6,432,283 B1
(45) Date of Patent: Aug. 13, 2002

(54) HYDROGEN FUEL REPLENISHMENT SYSTEM

(75) Inventors: Matthew J. Fairlie; William J. Stewart; Andrew T.B. Stuart; Steven J. Thorpe; Charlie Dong, all of Toronto (CA)

(73) Assignee: Stuart Energy Systems Corporation, Ontario (CA)

( * ) Notice: Subject to any disclaimer, the term of this patent is extended or adjusted under 35 U.S.C. 154(b) by 0 days.

(21) Appl. No.: 09/354,312

(22) Filed: Jul. 16, 1999

(30) Foreign Application Priority Data

May 12, 1999 (CA) .............................. 2271450

(51) Int. Cl.⁷ .............................. C25B 1/12; C25B 1/10; C25B 15/02
(52) U.S. Cl. .................... 204/230.2; 204/266; 204/278; 123/1 R
(58) Field of Search ................................ 204/278, 266, 204/230.2; 123/1 R

(56) References Cited

U.S. PATENT DOCUMENTS

| | | | |
|---|---|---|---|
| 4,002,553 A | * | 1/1977 | Artz ............................ 204/278 |
| 4,233,132 A | * | 11/1980 | Carr et al. ............... 204/278 X |
| 4,344,831 A | * | 8/1982 | Weber ..................... 204/278 X |
| 5,082,544 A | | 1/1992 | Willey et al. |
| 5,592,028 A | | 1/1997 | Prichard |
| 5,779,866 A | * | 7/1998 | Tarancon .................... 204/262 |
| 6,153,058 A | * | 11/2000 | Richardson, Jr. ....... 204/278 X |

* cited by examiner

Primary Examiner—Donald R. Valentine
(74) Attorney, Agent, or Firm—Manelli Denison & Selter; Edward J. Stemberger

(57) ABSTRACT

A hydrogen replenishment system for providing hydrogen to a hydrogen-receiving apparatus, the system comprising (i) an electrolytic cell for providing source hydrogen;
(ii) a compressor means for providing outlet hydrogen at an outlet pressure;
(iii) means for feeding the source hydrogen to the compressor means;
(iv) means for feeding the outlet hydrogen to the hydrogen-receiving apparatus;
(v) central processing unit means for controlling the cell and the compressor; and
(vi) user activation means for operably activating the central processing unit means.

The invention provides a practical user interface in the treatment of data provided, computed, measured and stored, to offer a convenient, essentially self-contained, hydrogen fuel replenishment system for vehicles based on water electrolysis. The apparatus has virtually no stored hydrogen and provides pressurized hydrogen on the demand of a user. The system is preferably operative at times of off-peak electrical supply, with electricity and water being substantially the only feedstock.

14 Claims, 5 Drawing Sheets

HYDROGEN FUEL REPLENISHMENT SYSTEM

FIELD OF THE INVENTION

This invention relates to the electrolytic production of hydrogen for use, particularly as a fuel for vehicles; and particularly to a system comprising an electrolytic cell for said production and a data network comprising data gathering, control and, optionally, storage.

BACKGROUND TO THE INVENTION

Electrosynthesis is a method for production of chemical reaction(s) that is electrically driven by passage of an electric current, typically a direct current (DC), through an electrolyte between an anode electrode and a cathode electrode. An electrochemical cell is used for electrochemical reactions and comprises anode and cathode electrodes immersed in an electrolyte with the current passed between the electrodes from an external power source. The rate of production is proportional to the current flow in the absence of parasitic reactions. For example, in a liquid alkaline water electrolysis cell, the DC current is passed between the two electrodes in an aqueous electrolyte to split water, the reactant, into component product gases, namely, hydrogen and oxygen where the product gases evolve at the surfaces of the respective electrodes.

Water electrolysers have typically relied on pressure control systems to control the pressure between the two halves of an electrolysis cell to insure that the two gases, namely, oxygen and hydrogen produced in the electrolytic reaction are kept separate and do not mix.

One such pressure control system provides a water seal to equalize pressure in the two halves of the cell. This is the approach most often followed in "home made" electrolysers. Typically the water seal is a couple of inches deep and so the cell operates at a couple of inches of WC pressure above atmospheric.

An alternative system provides a membrane separator which can sustain a pressure difference between the two halves of the cell without gas mixing. The PEM (polymer electrolyte membrane) cell is the best example of this type of system. The PEM cell can sustain up to a 2500 psi pressure difference without a significant loss of gas purity.

A third is an active control system which senses pressure and controls the outflow of gases from the two cells. Control can be achieved in one of two ways:

by a mechanical system which relies on pressure regulators, such as a dome-loaded flow regulator to control pressure between the two cells which, for example, might employ the oxygen pressure as a reference pressure to regulate the pressure in the hydrogen half of the cell; and by an electronic system which relies on measurement of the difference in gas pressure between the two cell to control the rates of gas outflow from the two sides of the cell so as to maintain a desired pressure difference of usually zero or with the hydrogen side slightly higher.

Typically, however, for very small commercial hydrogen generators (0.1 Nm$^3$/h) PEM type electrolysis cells are favoured. Although the cost of the cell is far higher than for conventional alkaline electrolysers, these costs are more than offset by the controls needed for the conventional alkaline systems using mechanical or electronic actuators, and by the need for higher pressures and, hence, compression in electrolysers using a water seal pressure control system.

A hydrogen fuel replenishment system is operative in at least one North American city, wherein a fleet of public vehicles, namely, transit buses are refueled on a timely i.e. generally daily, basis from a storage tank(s) in a bus depot.

The hydrogen fuel tank on the bus is attached solely to the storage tank and the quantity of hydrogen to be furnished is calculated from the initial pressure and desired resultant pressure as read from pressure gauges on the bus or on the ground storage tank.

At the depot, hydrogen is provided to the storage tank(s) from on-site electrolyser(s) which maintain hydrogen pressure at a pre-determined value in the tank(s). Replenishment time is, generally, about 20–30 minutes.

However, the aforesaid hydrogen fuel replenishment system suffers from a significant number of disadvantages, as follows.

1. Modulation of the electrolyser cell bank is only by manual operation.
2. The cell bank is not easy to modulate, and accordingly, if the demand for hydrogen to be stored and for refueling vehicles in real time is lower than the cell supply rate, it is necessary to vent the hydrogen, generally to atmosphere.
3. The cell bank in real time cannot be modulated to optimize electricity usage at times of favourable, reduced electricity costs rates.
4. Each vehicle is filled by only manual operation.
5. Each vehicle is filled independently of other vehicles in the depot.
6. The nature of the filling operation is steady state with respect to the rate of filling from the cell bank. In filling a vehicle tank with hydrogen, the expansion and compression within the tank causes the gas temperature to rise and, hence, to yield a false value of a high pressure (full tank) if the rate of filling is too rapid. Upon subsequent cooling, the tank pressure falls and the tank requires a refill (top up) to achieve a truer desired pressure.
7. The use of storage tank(s) expands the necessary green space and foot print required for a filling station.
8. The use of storage tank(s) provides a potential safety risk requiring proper management.

There is, therefore, a need for a hydrogen fuel replenishment system which does not suffer from the aforesaid disadvantages.

SUMMARY OF THE INVENTION

It is an object of the present invention to provide a system for the in situ generation, on demand, of hydrogen gas for use particularly as a fuel for vehicles, requiring negligible on-site hydrogen storage.

It is a further object to provide a hydrogen fuel replenishment system which provides a practical user friendly control and activation interface.

It is a further object of the present invention to provide efficacious methods and apparatus for producing hydrogen at a minimum desired pressure.

Accordingly, in one aspect, the invention provides a hydrogen replenishment system for providing hydrogen to a hydrogen-receiving apparatus, said system comprising (i) an electrolytic cell for providing source hydrogen;
(ii) a compressor means for providing outlet hydrogen at an outlet pressure;
(iii) means for feeding said source hydrogen to said compressor means;
(iv) means for feeding said outlet hydrogen to said hydrogen-receiving apparatus;

(v) central processing unit means for controlling said cell and said compressor; and (vi) user activation means for operably activating said central processing unit means.

As used herein the term "cell", "electrochemical cell" or "electrolyser" refers to a structure comprising at least one pair of electrodes including an anode and a cathode with each being suitably supported within an enclosure through which electrolyte is circulated and product is disengaged. The cell includes a separator assembly having appropriate means for sealing and mechanically supporting the separator within the enclosure. Multiple cells may be connected either in series or in parallel to form a cell stack and there is no limit on how may cells may be used to form a stack. In a stack the cells are connected in a similar manner, either in parallel or in series. A cell block is a unit which comprises one or more cell stacks and multiple cell blocks are connected together by an external bus bar. A functional electrolyser comprises one or more cells which are connected together either in parallel, in series, or a combination of both.

The electrolytic cell may comprise the compression means within its structure in that in one embodiment, hydrogen pressure is built up within the cell to the resultant desired user pressure and wherein the outlet hydrogen comprises source hydrogen.

The system and method according to the invention are of particular value for replenishing hydrogen fuel for a vehicle, such as a personal vehicle, truck, bus and the like.

Thus, the invention provides in a preferred aspect the system as hereinabove defined wherein said means (iv) comprises apparatus, preferably, vehicle attachment means attachable to the apparatus (vehicle) to provide the outlet hydrogen as fuel to the apparatus (vehicle). Accordingly, there is provided a system as hereinabove defined wherein means (iv) for feeding the outlet hydrogen to the hydrogen-receiving apparatus comprises conduit means and fitting engagement means adapted to be received in sealing engagement by said apparatus.

In an alternative embodiment, a system as hereinabove defined is provided wherein the conduit means and fitting engagement means comprises a plurality of conduits and fitting engagement members adapted to receive a plurality of the hydrogen-receiving apparatus.

The source hydrogen is preferably pumped through a conduit to the compressor.

The CPU comprises a system as hereinabove defined wherein the central processing unit comprises cell control means for activating the cell to provide the hydrogen source when the outlet pressure falls to a pre-selected value. The CPU preferably comprises the user activation means having data receiving means adapted to receive data from or by transfer means selected from the group consisting of an electronic data card, voice activation means, manually-operable selection and control means, radiated wavelength and electronic or electrical transfer. The CPU preferably comprises means for receiving and treating physical parameter data selected from the group consisting of temperature, pressures KOH anolyte and catholyte liquid levels, bus continuity, KOH concentration, gas purities and process valves positions of the cell; and modulating and controlling the cell in consequence of said treatment of the cell data. It further comprises means for receiving and treating physical parameter data selected from the group consisting of temperature, inlet and outlet hydrogen pressures and valve status of the compressor means; and modulating and controlling the compressor means in consequence of the treatment of the compression means data. The CPU preferably comprises means for receiving and treating data selected from the group consisting of hydrogen demand of the hydrogen-receiving apparatus; and means for determining the amount, rate of delivery and duration of delivery of hydrogen to the apparatus in consequence of the hydrogen demand data. The CPU preferably comprises storage means for storing data selected from the hydrogen demand data, dates, times of day and night, and numbers of hydrogen-receiving apparatus.

Most preferably the CPU is in direct electrical or electronic communication with each of the cell, compressor and user activation means by means of electrical wires.

Thus, the control means and activation means provide for a practical user interface.

The system as hereinabove defined has also preferred utility wherein the conduit means and fitting engagement means comprises a plurality of conduits and fitting engagement members adapted to receive a plurality of the hydrogen-receiving apparatus, for example, a plurality of vehicles at a commercial, industrial or like outlet.

The introduction of the user activation means in combination with the CPU allows the advantageous exchange of data flow between the cell(s), compressor, vehicles(s) and sundry process control valves and conduits. This user interface allows for 1. defined demand, in real time, of the hydrogen needs for all vehicles, single or a plurality thereof, connected to the cell bank;
2. defined time to fill each vehicle(s) connected to the cell bank;
3. modulation of the cell bank to ensure the exact supply of hydrogen required by all vehicles over time;
4. modulation of the compressor in conjunction with the cell bank to ensure adequate supply of hydrogen to all vehicles in the absence of any storage tank(s), which reduces safety concerns;
5. modulation of the rate of filling of each vehicle via dynamic control of filling to provide a variable rate of filling to stabilize the temperature of the gas within the vehicle(s) and to ensure a correct real time value of pressure so as to assess a level of filling of the tank (i.e. half full, full, etc.) and a successful completion of the filling operation;
6. the achievement of aforesaid (1) to (5) with no manual user intervention;
7. the completion of data history of the operation of the cell bank and compressor is stored/recorded in run time hours to permit schedule maintenance, and
8. a complete data history of the storage of each vehicle to be stored/recorded.

The invention is of particular value in one embodiment when the apparatus comprises a cell to provide hydrogen at a desired minimum pressure; comprising an anolyte solution having an anolyte liquid level;

a catholyte solution having a catholyte liquid level;

oxygen generation means for generating oxygen at an oxygen pressure above said anolyte;

hydrogen generation means for generating hydrogen at a hydrogen pressure above said catholyte;

generated hydrogen outlet means;

and comprising pressure means for raising the oxygen pressure above the anolyte to effect a positive liquid level pressure differential between said catholyte liquid level and said anolyte liquid level to a pre-selected value to effect closure of said hydrogen outlet means and an increase in the hydrogen pressure to a value to effect opening of said hydrogen outlet means to provide hydrogen at said desired minimum pressure through said outlet means.

This preferred aspect of the invention as hereinabove defined relies on creating a liquid level pressure differential between the catholyte liquid and the anolyte liquid levels by causing oxygen pressure build-up above the anolyte and fall in anolyte liquid level and a commensurate rise in catholyte level, while hydrogen is free to leave the cell until either (a) the anolyte level drops to a pre-selected level to trigger a control valve to prevent hydrogen release from the cell or (b) the catholyte level rises to similarly trigger the control value to similarly prevent hydrogen release from the cell. Subsequent build-up of hydrogen pressure above the catholyte reverses the respective liquid levels to effect opening of the control valves to provide hydrogen at the desired minimum pressure. Hydrogen pressure builds up under the closed release valve situation because two moles of hydrogen are produced for each mole of oxygen in the electrolytic process.

Accordingly in a further aspect, the invention provides a process for providing hydrogen at a desired minimum pressure from an electrolyser comprising an anolyte solution having an anolyte liquid level;
a catholyte solution having a catholyte liquid level;
oxygen generated at an oxygen pressure above said anolyte;
hydrogen generated at a hydrogen pressure above said catholyte for passage through hydrogen outlet means; the process comprising raising the oxygen pressure above the anolyte to effect a liquid levels pressure differential between said catholyte liquid level and said anolyte liquid level to a pre-selected value to effect closure of said hydrogen outlet means and an increase in the hydrogen pressure to a value to effect opening of said hydrogen outlet means to provide hydrogen at said desired minimum pressure.

In a further aspect, the invention provides an electrolyser for providing hydrogen at a desired minimum pressure comprising an anolyte solution having an anolyte liquid level;
a catholyte solution having a catholyte liquid level;
oxygen generation means for generating oxygen at an oxygen pressure above said anolyte;
hydrogen generation means for generating hydrogen at a hydrogen pressure above said catholyte;
generated hydrogen outlet means; and comprising pressure means for raising the oxygen pressure above the anolyte to effect a liquid level pressure differential between said catholyte liquid level and said anolyte liquid level to a pre-selected value to effect closure of said hydrogen outlet means and an increase in the hydrogen pressure to a value to effect opening of said hydrogen outlet means to provide hydrogen at said desired minimum pressure through said outlet means.

BRIEF DESCRIPTION OF THE DRAWINGS

In order that the invention may be better understood preferred embodiments will now be described by way of example only, with reference to the accompanying drawings wherein.

DETAILED DESCRIPTION OF PREFERRED EMBODIMENTS

Figure 1:
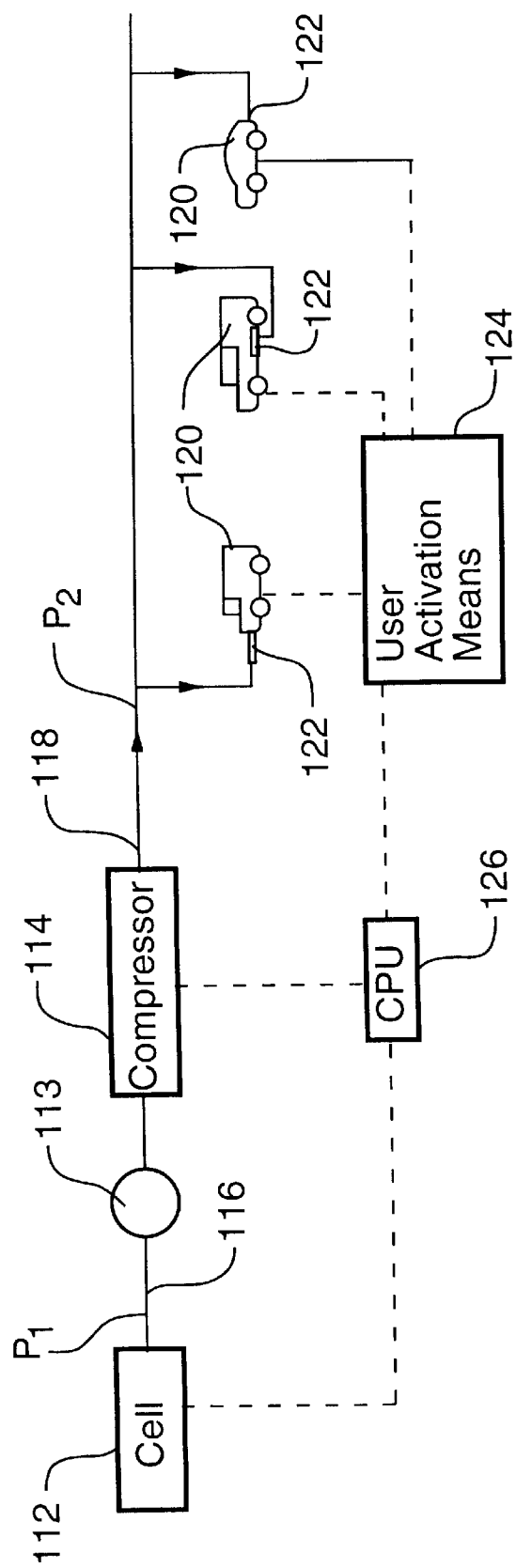
FIG. 1 is a block diagram showing the major features of a hydrogen fuel supply system according to the invention.

With reference to FIG. 1, this shows a system according to the invention shown generally as 100 having an electrolyser cell 112 which produces source hydrogen at a desired pressure $P_1$ fed to compressor 114 through conduit 116. Compressor 114 feeds compressed outlet hydrogen through conduit 118 to apparatus 120 at pressure $P_2$, exemplified as a vehicle attached by a fitting 122. Cell 112, compressor 114 and user 124 are linked to a computer processor unit control means 126 which provides both data acquisition and process control.

In more detail, user 124 defines a demand to fill vehicle 120. User 124 may transmit its demand by means of use of (i) a credit card; (ii) a smart card; (iii) a voice activation system; (iv) manual activation via front panel control, and by transmission by, for example, wire or infrared or other suitable radiation from vehicle 120, itself.

Upon receipt of the demand, CPU 126 determines the status of electrochemical cell 112, which initial status check includes monitoring of the process parameters for starting cell 112 and, in particular, temperature, pressure, anolyte liquid level, catholyte liquid level, bus continuity, KOH concentration, and process valve status. Further, upon receipt of the demand, CPU 126 determines the initial status of compressor 114. Such initial checks include monitoring of the temperature, inlet and outlet pressure in one or more stages.

After CPU 126 determines the initial status of cell 112 and compressor 114, CPU 126 analyses the needs of user 124 in terms of the quantity of hydrogen to be delivered, the rate of delivery, and duration of the time of delivery to vehicle 120. CPU 126 then initiates the starting sequence for cell 112 to ensure the demands of user 124. Power is applied to cell 112 and the process parameters of temperature, pressure, anolyte liquid level, catholyte liquid level, KOH concentration and process valve status are monitored and controlled in such a fashion as permit safe operation of cell 112 in the generation of hydrogen and oxygen gases of some minimum purities. An incorrect status in any of the operational parameters noted above or in the quality/purity of the product gases causes CPU 126 to alter or interrupt the operation of cell 112 until an appropriate status has been reached.

Upon successful operation of cell 112, CPU 126 then monitors the pressure, $P_1$, in the conduit between cell 112 and compressor 114 via a pressure sensor installed in line 116. Upon reaching a minimum pressure, $P^*$, in conduit 116, CPU 126 having previously recognized an appropriate status for compressor 114, turns compressor 114 on and begins to discharge gas into conduit 118 at some pressure, $P_2$. CPU 126 then monitors the pressure in conduit 118 via a pressure sensor (not shown) to ensure that the pressure, $P_2$, reaches some minimum pressure, $P_2^*$, for suitable discharge into vehicle 120 as demanded by user 124.

The operations of cell 112 and compressor 114 are suitably modulated and controlled by CPU 126 through appropriate process valves so as to provide the minimum quantity of hydrogen at the minimum rate of delivery over the minimum amount of time as specified by user 124 such that the requirements of vehicle 120 are met. Upon receiving notification from vehicle 120 that the requirements have been successfully met, CPU 126 instructs cell 112 and compressor 114 to cease operation and to ensure discharge of any remaining pressure to some minimum acceptable value, $P_2^{}$, in conduit 118 such that user 124 can facilitate the disconnection of vehicle 120 from conduit 118** and complete the filling operation.

Figure 2:
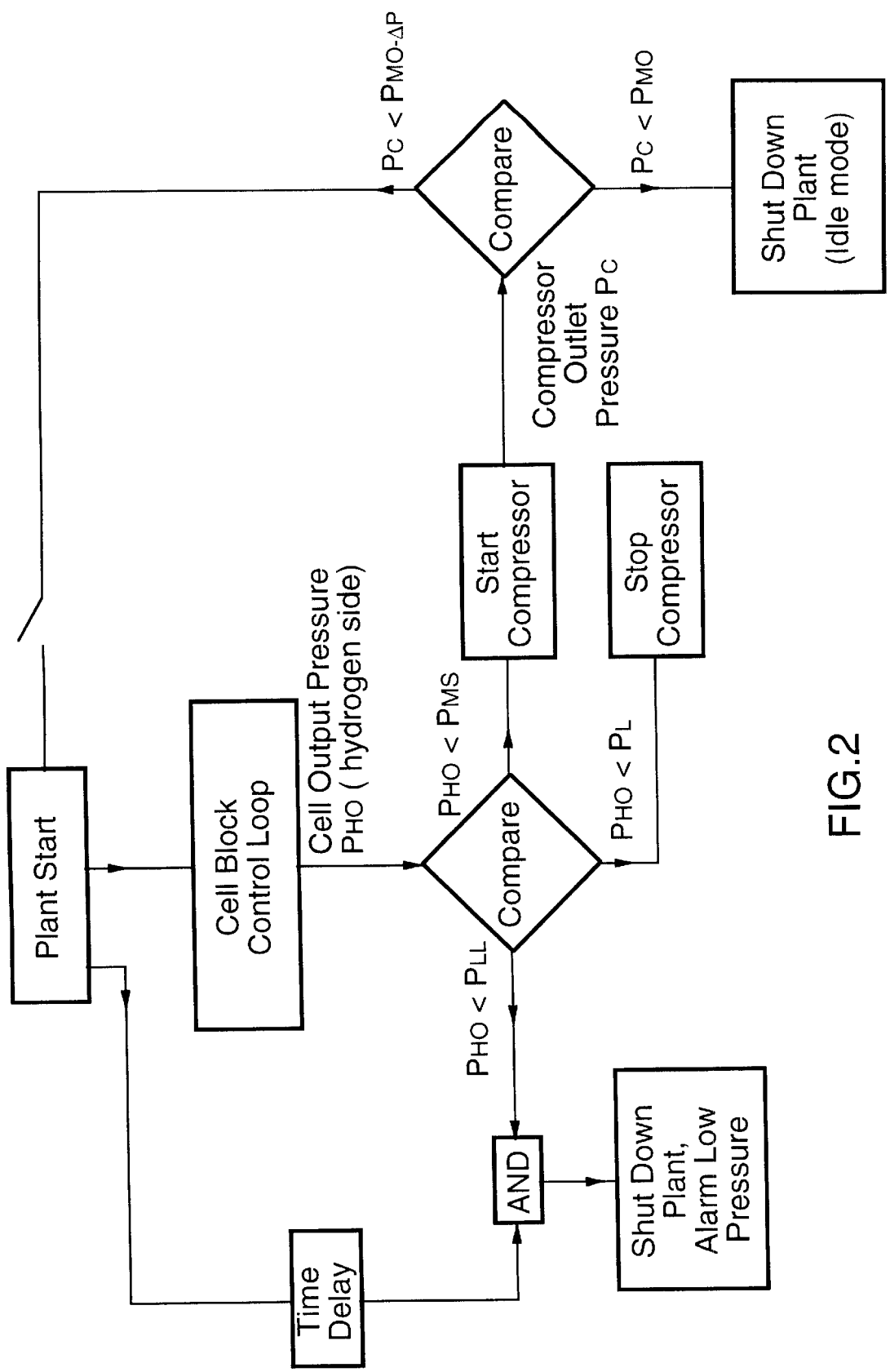
FIG. 2 is a logic block diagram of the control program of one embodiment of the system according to the invention.
Figure 3:
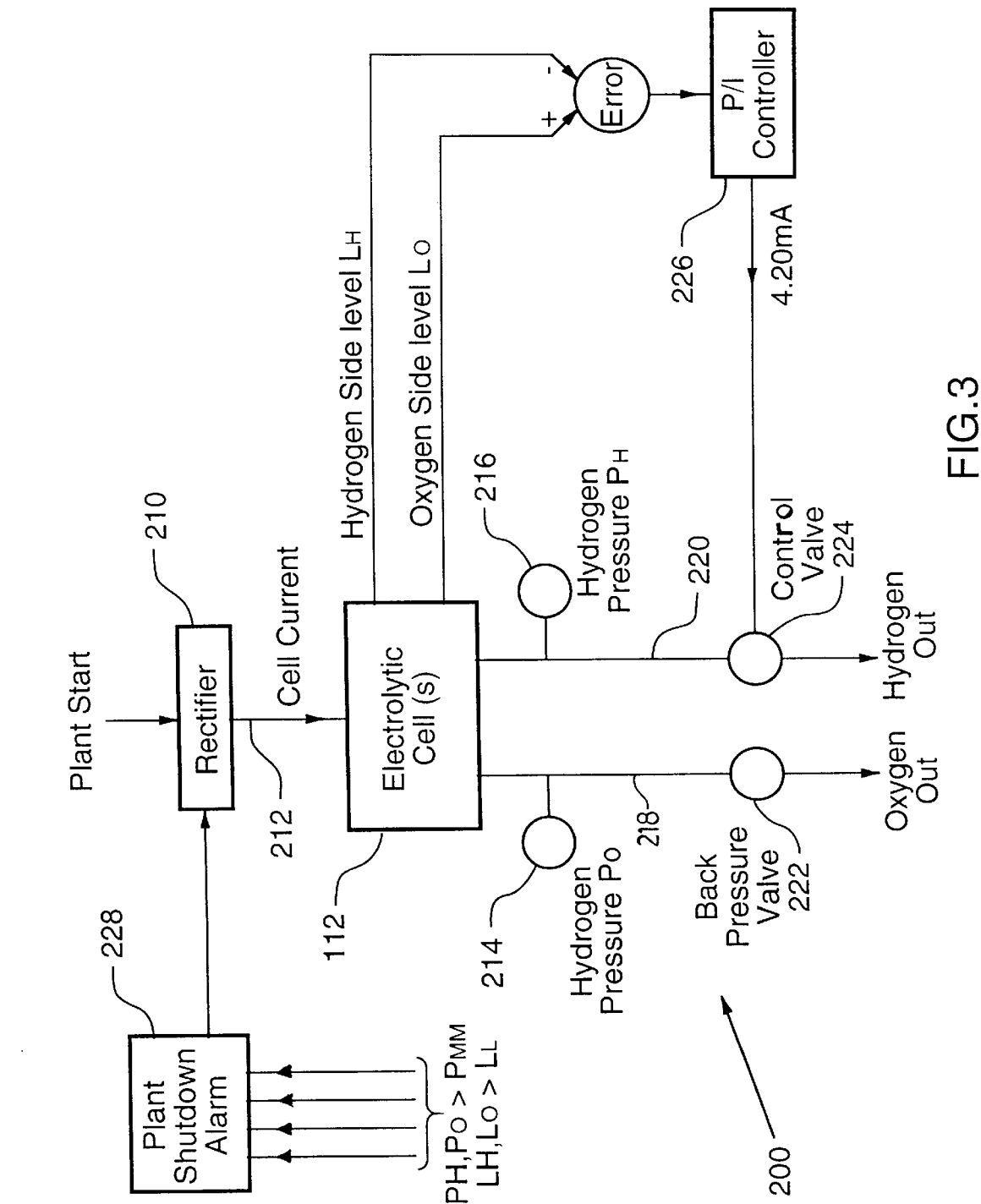
FIG. 3 is a logic block diagram of a cell block control loop of the control program of FIG. 2.

With reference to FIG. 2 this shows the logic control steps effective in the operation of the system as a whole, and in FIG. 3 the specific cell control loop, sub-unit wherein a logical block diagram of the control program of one embodiment of the system according to the invention; wherein $P_{MS}$—Compressor start pressure;
$P_L$—Compressor stop pressure;
$P_{LL}$—Inlet low pressure;
$P_{MO}$—Tank full pressure;
$\Delta P$—Pressure switch dead band;
$P_{MM}$—Maximum allowable cell pressure;
$L_L$—Minimum allowable cell liquid level;
$P_{HO}$—Cell output pressure on the hydrogen side; and
$P_C$—Compressor outlet pressure.

In more detail, FIG. 2 shows the logic flow diagram of the control program for the operation. Upon plant start-up, cell 112 generates hydrogen gas at some output pressure, $P_{HO}$. The magnitude of such pressure, $P_{HO}$, is used to modulate the operation of compressor 114. If $P_{HO}$ is less than some minimum pressure related to the liquid level in 112, $P_{LL}$, a low pressure alarm is generated and a plant shutdown sequence is followed. If the output pressure, $P_{HO}$, is greater than $P_{LL}$, then a further comparison is made. If the output pressure, $P_{HO}$, is greater than $P_{MS}$, the minimum input pressure to start compressor 114, the latter begins a start sequence. If the output pressure is less than some minimum value, $P_L$, then compressor 114 remains at idle (stopped) until such time as the magnitude of $P_{HO}$ exceeds $P_{MS}$ to begin compressor operation.

Upon starting compressor 114, the hydrogen gas is compressed in one or more stages to reach an output pressure, $P_C$, from the exit of compressor 114. If the output pressure, $P_C$, exceeds a safety threshold, $P_{MO}$, then operation of compressor 114 is terminated. If the output, $P_C$, is less than some desired minimum, $P_{MO}$–$\Delta P$, compressor 114 runs to supply and discharge hydrogen.

FIG. 3 comprises a block diagram of the hydrogen fuel replenishment apparatus shown generally as 200 used to supply hydrogen and/or oxygen gas at a minimum desired pressure. Apparatus 200 includes a rectifier 210 to convert an a.c. signal input to a desired d.c. signal output, a bus bar 212, electrolytic cell(s) 112, means of measuring oxygen 214 and hydrogen 216 pressure in conduits 218 and 220, respectively, valve means for controlling the flow of oxygen 222 and hydrogen 224, respectively, and a process/instrument controller 226 to ensure desired operation of electrolytic cell(s) 112 with suitable plant shutdown alarms 228.

FIG. 3 also comprises a process flow diagram for the cell block of FIG. 2. Upon plant start-up, rectifier 210 establishes a safe condition by examining the status of plant alarm 228 with respect to pressure and level controls. If the alarm indicates a safe status, current and voltage (power) are transmitted along cell bus bar 212 from rectifier 210 to electrolytic cell 112. With the application of a suitable current/voltage source, electrolysis takes place within electrolytic cell(s) 112 with the resultant decomposition of water into the products of hydrogen gas and oxygen gas. The oxygen gas is transported along conduit 218 in which oxygen pressure means 214 monitors oxygen pressure, $P_O$, at any time, and to control oxygen pressure via modulation of valve 222. Similarly, the hydrogen gas is transported along conduit 220 in which means 216 monitors hydrogen pressure, $P_H$, at any time, and to control hydrogen pressure via control valve 224. In the operation of electrolytic cell(s) 112, the anolyte level of the cell on the oxygen side, $L_O$, and the catholyte level on the hydrogen side, $L_L$, are detected via P/I controller 226 to provide a control signal to valve 224 to facilitate the supply of hydrogen and/or oxygen gas at some desired pressure.

Figure 4:
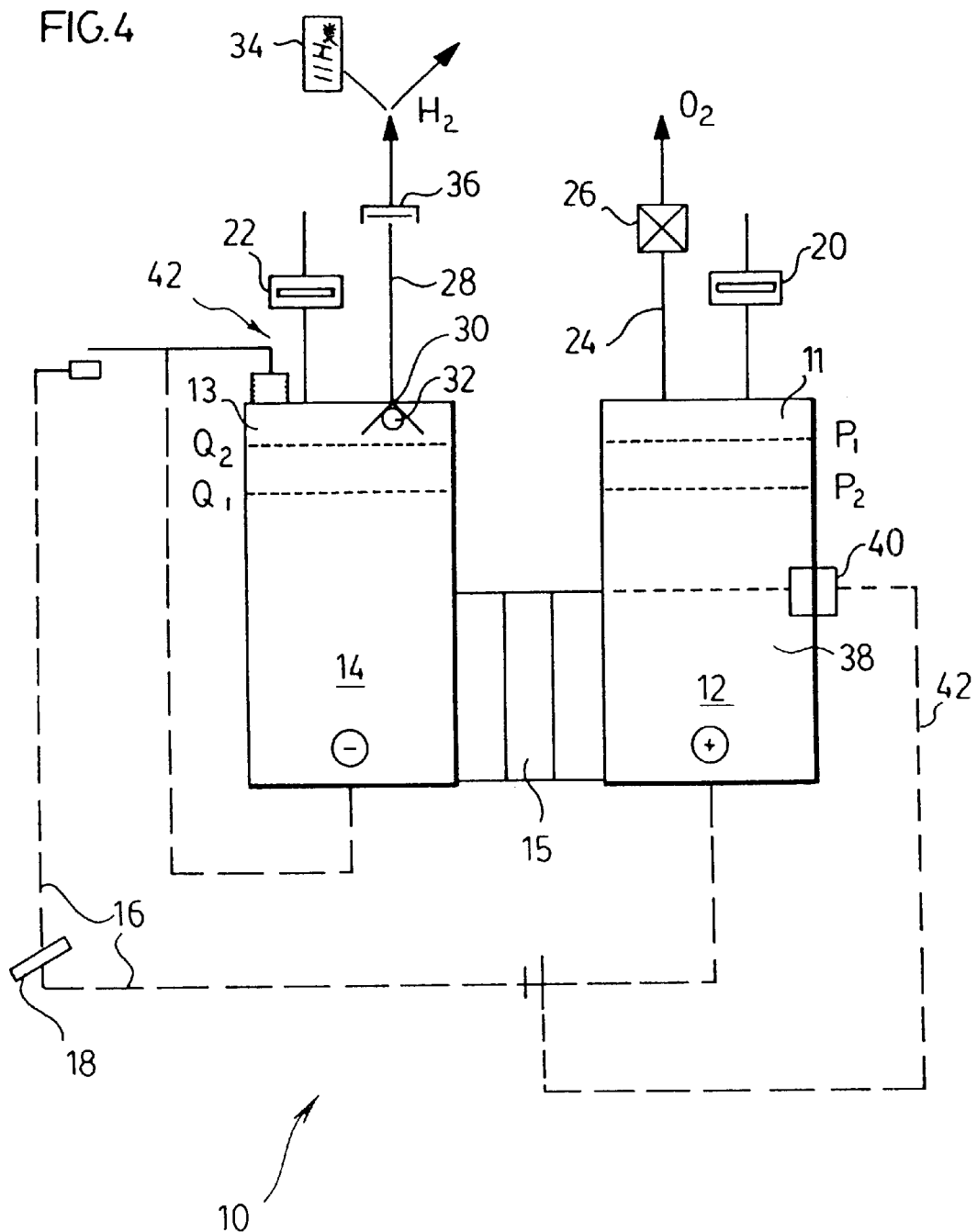
FIG. 4 is a block diagram of an electrolyser according to the invention.

With reference to FIG. 4, this shows generally as 10 an electrolyser having an oxygen gas product chamber 11 above anolyte 12, a hydrogen gas product chamber 13 above catholyte 14, cell membrane 15, electrical connections 16 to a solar energy power source 18, oxygen and hydrogen pressure release vents 20 and 22, respectively. Oxygen product line 24 has a regulator check valve 26 set at a desired pre-selected value. While hydrogen product line 28 has an outlet 30 to receive a bobber or float ball 32 on the catholyte surface in sealing engagement therewith as explained hereinbelow.

Hydrogen outlet product line 28 leads, in the embodiment shown, to a metal hydride chamber 34, through a disconnect fitting 36. Anolyte cell half 38 has a safety low liquid level electrical switch 40 connected through electrical conduit 42 to power source 18.

In operation, oxygen gas builds up in chamber 11, since oxygen release is controlled by regulator 26, set at a desired pressure, typically up to 100 psi and preferably about 60 psi. Hydrogen produced escapes chamber 13 through open outlet 30 while the oxygen pressure in chamber 11 builds up to cause liquid anolyte level to fall from its initial start-up level $P_1$ to lower operating level $P_2$ with a concomitant rise in catholyte level from start-up $Q_1$ to sealing level $Q_2$, whereby float 32 seals outlet 30. However, since hydrogen gas is produced twice as fast by volume than oxygen gas in cell 10, hydrogen pressure builds up to a value which forces a lowering of catholyte level to a degree which causes bobber 32 to partially disengage outlet 30 and release of hydrogen at that value pre-determined by regulator 26.

Accordingly, a steady state supply of hydrogen at the desired minimum pressure is provided to metal hydride production unit 34, or elsewhere as desired.

Oxygen product may be taken-off at pressure through valve 26 or vent 20.

Pressure release features are provided by bellows system 42, vents 20, 22 and low level switch 40 which cuts off power to cell 10 if oxygen pressure build up in chamber 11 is excessive.

Thus, notwithstanding the ability of cell 10 according to the invention to provide hydrogen and oxygen at desired minimum pressures, the pressure differential across cell membrane 15 is low.

Figure 5:
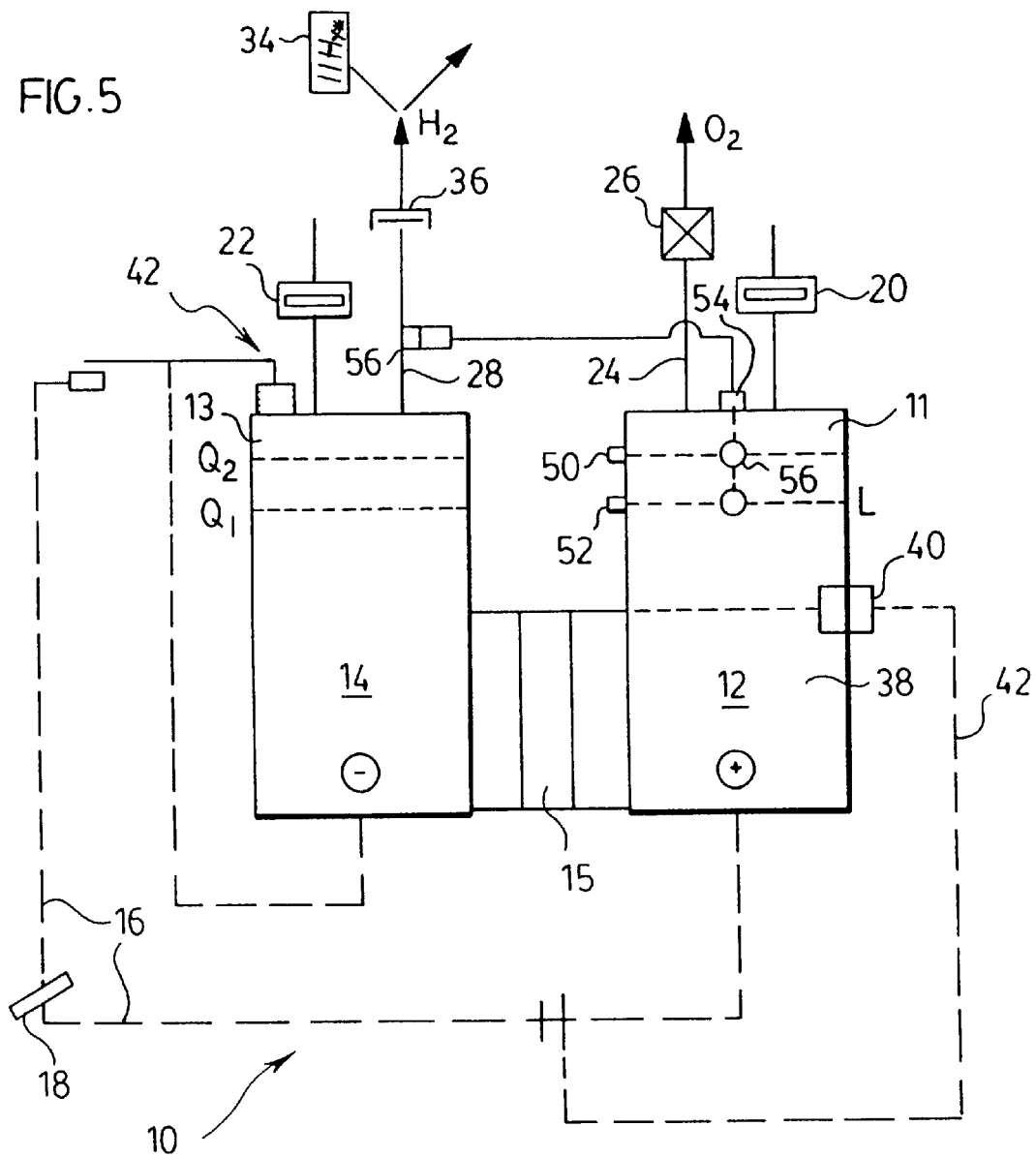
FIG. 5 is an alternative embodiment of an electrolyser according to the invention; and wherein the same numerals denote like parts.

With reference now to alternative embodiment shown in FIG. 5 this shows, basically cell 10 having hydrogen production line 28 under a valve control not by floating bobber means 32 but by actual anolyte level sensing and associated control means.

In more detail, in this embodiment cell 10 has a pair 50, 52 of hydrogen product line 28. Anolyte level sensors 50, 52 operably connected through control means 54 to activate a solenoid value 56 so positioned that upper sensor 50 maintains valve 56 open, until oxygen pressure build up in chamber 11 forces the anolyte level to drop to a desired pre-selected level where it activates sensor 52 and control 54 which overrides sensor 50 to close valve 56. Build up of hydrogen pressure causes sensor 52 to be inactivated by a rise in anolyte level and defer to sensor 50, which causes valve 56 to open and release product hydrogen at the desired minimum value. A steady state of activation and deactivation may ensure if liquid level pressure differentials fluctuate otherwise hydrogen gas is continuously provided at the requisite minimum pressure set by oxygen regulator 26.

Although this disclosure has described and illustrated certain embodiments of the invention, it is to be understood that the inventions is not restricted to those particular embodiments. Rather, the invention includes all embodiments which are functional or mechanical equivalence of the specific embodiments and features that have been described and illustrated.

What is claimed is:

1. A hydrogen replenishment system for providing hydrogen to a hydrogen-receiving apparatus, said system comprising
    (i) an electrolytic cell for providing source hydrogen;
    (ii) a compressor means for providing outlet hydrogen at an outlet pressure;
    (iii) means for feeding said source hydrogen to said compressor means;
    (iv) means for feeding said outlet hydrogen to said hydrogen-receiving apparatus;
    (v) central processing unit means for controlling said cell and said compressor; and
    (vi) user activation means for operably activating said central processing unit means, wherein there is exchange of data flow between said central processing unit means and said user activation means.

2. A system as defined in claim 1 wherein said means for feeding said source hydrogen to said compressor means comprises conduit means and pump means.

3. A system as defined in claim 1 wherein said means (iv) for feeding said outlet hydrogen to said hydrogen-receiving apparatus comprises conduit means and fitting engagement means adapted to be received in sealing engagement by said apparatus.

4. A system as defined in claim 3 wherein said conduit means and fitting engagement means comprises a plurality of conduits and fitting engagement members adapted to receive a plurality of said hydrogen-receiving apparatus.

5. A system as defined in claim 1 wherein said central processing unit comprises cell control means for activating said cell to provide said hydrogen source when said outlet pressure falls to a pre-selected, value.

6. A system as defined in claim 1 wherein said user activation means comprises data receiving means adapted to receive data from transfer means selected from the group consisting of an electronic data card, voice activation means, manually-operable selection and control means, radiated wavelength and electronic or electrical transfer.

7. A system as defined in claim 1 wherein said central processing unit means comprises means for receiving and treating physical parameter data selected from the group consisting of temperature, pressures anolyte and catholyte liquid levels, bus continuity, KOH concentration, gas purities and process valves positions of said cell; and modulating and controlling said cell in consequence of said treatment of said cell data.

8. A system as defined in claim 1 wherein said central processing unit means comprises means for receiving and treating physical parameter data selected from the group consisting of temperature, inlet and outlet hydrogen pressures and valve status of said compressor means; and modulating and controlling said compressor means in consequence of said treatment of said compression means data.

9. A system as defined in claim 1 wherein said central processing unit means comprises means for receiving and treating data selected from the group consisting of hydrogen demand of said hydrogen-receiving apparatus; and means for determining the amount, rate of delivery and duration of delivery of hydrogen to said apparatus in consequence of said hydrogen demand data.

10. A system as defined in claim 1 wherein said central processing unit means comprises storage means for storing data selected from said hydrogen demand data, dates, times of day and night, and numbers of hydrogen-receiving apparatus.

11. A system as defined in claim 1 wherein said electrolytic cell comprises said compression means whereby source hydrogen comprises said outlet hydrogen.

12. A system as defined in claim 1 comprising an electrolyser for providing hydrogen at a desired minimum pressure comprising
    an anolyte solution having an anolyte liquid level;
    a catholyte solution having a catholyte liquid level;
    oxygen generation means for generating oxygen at an oxygen pressure above said anolyte;
    hydrogen generation means for generating hydrogen at a hydrogen pressure above said catholyte;
    generated hydrogen outlet means;
    hydrogen outlet closure means; oxygen pressure means for raising the oxygen pressure above the anolyte to effect a positive liquid level pressure differential between said catholyte liquid level and said anolyte liquid level to a pre-selected value to effect closure of said hydrogen outlet means and a subsequent increase in the hydrogen pressure to a value to effect opening of said hydrogen outlet means to provide hydrogen at said desired minimum pressure through said outlet means.

13. A system as defined in claim 1 comprising an electrolyser for providing hydrogen at a desired minimum pressure from said electrolyser comprising
    an anolyte solution having an anolyte liquid level;
    a catholyte solution having a catholyte liquid level;
    hydrogen outlet means;
    oxygen outlet means;
    oxygen generation means for providing oxygen generated at an oxygen pressure above said anolyte;
    hydrogen generation means for providing hydrogen generated at a hydrogen pressure above said catholyte for passage through hydrogen outlet means;
    means for operably raising the oxygen pressure above the anolyte to effect a liquid levels pressure differential between said catholyte level and said anolyte level to a pre-selected value to effect closure of said hydrogen outlet means and an increase in the hydrogen pressure to a value to effect opening of said hydrogen outlet means to provide hydrogen at said desired minimum pressure.

14. A system as defined in claim 1 wherein said hydrogen-receiving apparatus is a vehicle.

* * * * *